US012674022B2

(12) United States Patent
Masuda et al.

(10) Patent No.: US 12,674,022 B2
(45) Date of Patent: Jul. 7, 2026

(54) METHOD FOR PRODUCING ALIPHATIC POLYESTER, ALIPHATIC POLYESTER RESIN, AND ALIPHATIC POLYESTER RESIN COMPOSITION

(71) Applicant: TEIJIN LIMITED, Osaka (JP)

(72) Inventors: Takaya Masuda, Osaka (JP); Masanori Miyamoto, Osaka (JP)

(73) Assignee: TEIJIN LIMITED, Osaka (JP)

( * ) Notice: Subject to any disclaimer, the term of this patent is extended or adjusted under 35 U.S.C. 154(b) by 794 days.

(21) Appl. No.: 17/916,900

(22) PCT Filed: Mar. 31, 2021

(86) PCT No.: PCT/JP2021/013944
§ 371 (c)(1),
(2) Date: Oct. 4, 2022

(87) PCT Pub. No.: WO2021/205961
PCT Pub. Date: Oct. 14, 2021

(65) Prior Publication Data
US 2023/0151143 A1 May 18, 2023

(30) Foreign Application Priority Data
Apr. 6, 2020 (JP) ................................. 2020-068495

(51) Int. Cl.
*C08G 63/08* (2006.01)
*C08G 63/06* (2006.01)
*C08L 67/04* (2006.01)

(52) U.S. Cl.
CPC .............. *C08G 63/08* (2013.01); *C08G 63/06* (2013.01); *C08G 2261/418* (2013.01); *C08L 67/04* (2013.01)

(58) Field of Classification Search
CPC .. C08G 63/08; C08G 63/06; C08G 2261/418; C08L 67/04
See application file for complete search history.

(56) References Cited

U.S. PATENT DOCUMENTS

| | | | |
|---|---|---|---|
| 9,447,228 B2 | 9/2016 | Satoh et al. | |
| 2014/0296448 A1 | 10/2014 | Nemoto et al. | |
| 2015/0141611 A1 | 5/2015 | Satoh et al. | |
| 2015/0361213 A1* | 12/2015 | Kamada .................. | C08G 63/08 422/131 |
| 2016/0280849 A1 | 9/2016 | Kamada et al. | |

FOREIGN PATENT DOCUMENTS

| | | |
|---|---|---|
| JP | 2006-265486 A | 10/2006 |
| JP | 2008-120878 A | 5/2008 |
| JP | 2008-163073 A | 7/2008 |
| JP | 2009-001614 A | 1/2009 |
| JP | 2009-132769 A | 6/2009 |
| JP | 2009-144127 A | 7/2009 |
| JP | 2013-166944 A | 8/2013 |
| JP | 2014-159553 A | 9/2014 |
| JP | 2015-120874 A | 7/2015 |
| JP | 2015-120883 A | 7/2015 |
| JP | 2015-131967 A | 7/2015 |
| JP | 2016-11389 A | 1/2016 |
| KR | 10-2015-0107865 A | 9/2015 |

OTHER PUBLICATIONS

Hong et al (Completely recyclable biopolymers with linear and cyclic topologies via ring-opening polymerization of γ-butyrolactone, Nature Chemistry, vol. 8, Jan. 2016, pp. 42-49, published Jan. 2016.*

Aoki et al (JP 2008163073), Machine translation, published on Jul. 17, 2008.*

International Preliminary Report on Patentability dated Oct. 6, 2022 with a Translation of the Written Opinion of the International Searching Authority in Application No. PCT/JP2021/013944.

Office Action issued Jul. 17, 2024 in Korean Application No. 10-2022-7036801.

International Search Report for PCT/JP2021/013944 dated Jun. 1, 2021.

Official Communication dated Aug. 14, 2023 in European Application No. 21784996.7.

Communication dated Nov. 23, 2025, issued in Chinese Application No. 202311030601.2.

* cited by examiner

*Primary Examiner* — Gregory Listvoyb
(74) *Attorney, Agent, or Firm* — Sughrue Mion, PLLC

(57) ABSTRACT

An object of the present disclosure is to provide a method for producing an aliphatic polyester resin which substantially does not contain impurities, such as metals, and which has high molecular weight, particularly a polylactic acid having high molecular weight and high optical purity. The method for producing an aliphatic polyester resin of the present disclosure has a step of contacting a solution containing a cyclic ester with a cyclic amine catalyst and a polymerization initiator to initiate a reaction, a step of conducting the reaction by flow-type polymerization, and a step of subjecting the product obtained in the flow-type polymerization to further reaction by postpolymerization by stirring.

5 Claims, 1 Drawing Sheet

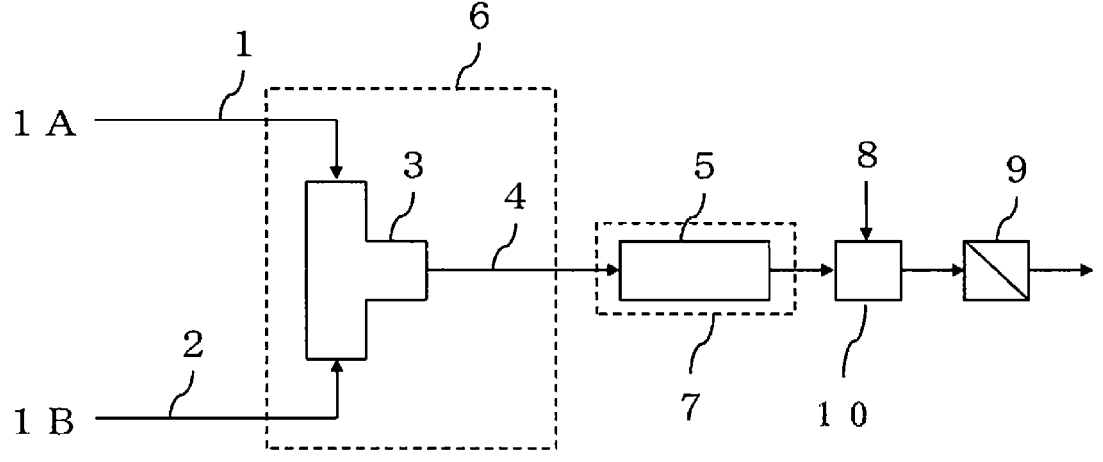

METHOD FOR PRODUCING ALIPHATIC POLYESTER, ALIPHATIC POLYESTER RESIN, AND ALIPHATIC POLYESTER RESIN COMPOSITION

This application is a National Stage of International Application No. PCT/JP2021/013944 filed Mar. 31, 2021, claiming priority based on Japanese Patent Application No. 2020-068495 filed Apr. 6, 2020.

TECHNICAL FIELD

The present disclosure relates to a method for producing an aliphatic polyester having high molecular weight and high optical purity, an aliphatic polyester resin, and an aliphatic polyester resin composition.

BACKGROUND ART

Many of petroleum-derived plastics are lightweight and have high toughness as well as excellent durability, and can be easily formed, and therefore have been used in many applications. However, when these plastics are disposed of, they are unlikely to be decomposed so that they are built up as such in the environment. Further, when the plastics are burnt, a great amount of carbon dioxide is emitted, accelerating global warming. Under circumstances, the development is being energetically made with respect to the resins that are not derived from petroleum and the biodegradable resins that are to degradable due microorganisms. Especially, aliphatic polyesters, such as polylactic acid and polycaprolactone, are easily degraded by microorganisms and have excellent mechanical strength, and hence are most likely studied. The aliphatic polyester is synthesized by ring-opening polymerization of a cyclic ester in many cases, and generally, a metal catalyst, such as tin octanoate, is used as a polymerization catalyst in the synthesis.

The metal catalyst remains in the aliphatic polyester unless the step of cleaning with an acid, removing metals, or the like is conducted, and adversely affects the heat resistance of the aliphatic polyester and safety. Therefore, a method for producing an aliphatic polyester without using a metal catalyst is required.

In order to solve the above-mentioned problems, attempts have been made to obtain an aliphatic polyester which substantially does not contain a metal. For example, PTL 1 discloses a method for producing an aliphatic polyester, in which a cyclic ester is subjected to ring-opening polymerization in an organic solvent in the presence of a compound having a guanidine skeleton as a catalyst.

CITATION LIST

Patent Literature

PTL 1: JP-A-2008-163073

SUMMARY OF INVENTION

Technical Problem

However, in the method described in PTL 1, the obtained polylactic acid has a weight average molecular weight of 210,000 or less, and the molecular weight is reduced when increasing the optical purity. In ring-opening polymerization using an organic catalyst, this problem is caused due to the relationship between the optical purity and the molecular weight, that is, when the reaction temperature is increased for achieving high molecular weight, a side reaction lowers the optical purity, whereas, when the reaction temperature is reduced to increase the optical purity, a polylactic acid having high molecular weight cannot be obtained.

Moreover, in the method described in PTL 1, it is likely that the obtained polylactic acid has a wide molecular weight distribution. In addition, there is a problem in that when melting the polylactic acid upon melt forming, the weight average molecular weight of the polylactic acid is markedly reduced, as compared to that before the melt forming. The reduction of the weight average molecular weight or optical purity and widening of the molecular weight distribution have been considered to be caused due to impurities contained in the polylactic acid, such as metals. Further, application of such polylactic acid having low weight average molecular weight or optical purity to materials required to have mechanical physical properties, such as a bioabsorbable screw, is difficult, and therefore a novel polylactic acid which can solve the problems has been desired.

Accordingly, an object of the present disclosure is to provide a method for obtaining an aliphatic polyester which has reduced impurities in the polymer, such as metals, and which has a higher molecular weight than that in PTL 1, particularly a method for obtaining a polylactic acid having high molecular weight and high optical purity. Further, in another embodiment of the present disclosure, an object is to provide a polylactic acid resin which has a narrow molecular weight distribution after melt forming and has improved modulus and stress at yield point, and which exhibits excellent formability, and further to provide a polylactic acid resin composition which has a reduced lactide content even after melt forming.

Solution to Problem

In view of the above, the present inventors have conducted extensive and intensive studies. As a result, it has been found that, by conducting postpolymerization by stirring, such as batch polymerization, after flow-type polymerization using a cyclic amine catalyst, an aliphatic polyester resin which substantially does not contain impurities, such as metals, and which has high molecular weight, particularly a polylactic acid having high molecular weight and high optical purity can be obtained, and the contents of the present disclosure have been completed. Specifically, the present disclosure includes the following embodiments.

[1] A method for producing an aliphatic polyester, comprising a step of contacting a solution containing a cyclic ester with a cyclic amine catalyst and a polymerization initiator and lowering the temperature from room temperature to initiate a reaction, a step of conducting the reaction by flow-type polymerization, and a step of subjecting a product obtained in the flow-type polymerization to further reaction by postpolymerization by stirring.

[2] The method according to item [1] above, wherein the reaction temperature for the flow-type polymerization is 5° C. or lower, and the reaction temperature for the postpolymerization is 5° C. or lower.

[3] The method according to item [1] or [2] above, wherein the postpolymerization by stirring is batch polymerization.

[4] The method according to any one of items [1] to [3] above, wherein the product obtained in the flow-type polymerization has a polymer conversion of 45 to 90%.

[5] The method according to any one of items [1] to [4] above, wherein the cyclic ester is L-lactide or D-lactide.

[6] An aliphatic polyester resin which does not contain a metal component selected from the group consisting of tin, titanium, aluminum, zinc, zirconium, and antimony, and has a weight average molecular weight of 500,000 or more and an enthalpy of 15.0 J/g or less, based on cooling crystallization made when conducting DSC measurement under the following measurement conditions:

Measurement Conditions:

that, using a differential scanning calorimeter, a sample is heated from room temperature to 200° C. at 10° C./minute, and then cooled to 20° C. at 5° C./minute or 2° C./minute.

[7] The aliphatic polyester resin according to item [6] above, which is a polylactic acid.

[8] The aliphatic polyester resin according to item [6] or [7] above, which has an optical purity of 95% or more.

[9] An aliphatic polyester resin composition comprising an aliphatic polyester resin which does not contain a metal component selected from the group consisting of tin, titanium, aluminum, zinc, zirconium, and antimony, and has a weight average molecular weight of 500,000 or more and an enthalpy of 15.0 J/g or less, based on cooling crystallization made when conducting DSC measurement under the following measurement conditions:

Measurement Conditions:

that, using a differential scanning calorimeter, a sample is heated from room temperature to 200° C. at 10° C./minute, and then cooled to 20° C. at 5° C./minute or 2° C./minute.

[10] The aliphatic polyester resin composition according to item [9] above, wherein the aliphatic polyester resin is a polylactic acid.

[11] The aliphatic polyester resin composition according to item [9] or [10] above, which has an optical purity of 95% or more.

[12] The aliphatic polyester resin composition according to any one of items [9] to [11] above, which has a lactide content of 4,500 ppm or less.

[13] The aliphatic polyester resin composition according to any one of items [9] to [12] above, wherein the polylactic acid resin composition obtained after subjected to heat-melting in a nitrogen atmosphere at 200° C. for 30 minutes has a lactide content of 4,000 ppm or less.

[14] A formed article comprising the aliphatic polyester resin composition according to any one of items [9] to [13] above.

[15] A medical material comprising the aliphatic polyester resin composition according to any one of items [9] to [13] above.

Advantageous Effects of Invention

In the present disclosure, there is provided a method for producing an aliphatic polyester which substantially does not contain impurities, such as metals, and which has high molecular weight. Further, in a preferred embodiment of the present disclosure, there can be provided a method for producing particularly a polylactic acid having high molecular weight and high optical purity. Further, in the present disclosure, there can be obtained a polylactic acid resin which has a narrow molecular weight distribution after melt forming and has improved modulus and stress at yield point, and which exhibits excellent formability. Furthermore, there can be provided a polylactic acid resin composition which has a reduced lactide content even after melt forming.

BRIEF DESCRIPTION OF DRAWING

FIG. 1 A diagrammatic view showing the method for producing an aliphatic polyester resin of the present disclosure.

DESCRIPTION OF EMBODIMENTS

Hereinbelow, an embodiment of the present disclosure will be described. The description of the embodiment and the Examples are examples of the embodiment, and should not be construed as limiting the range of the embodiment.

In the present disclosure, the range of values indicated using the preposition "to" means a range of values including the respective values shown before and after the preposition "to" as the minimum value and the maximum value. With respect to the range of values stepwise described in the present disclosure, the upper limit or lower limit described in a certain range of values may be replaced by the upper limit or lower limit of another range of values stepwise described. Further, with respect to the range of values described in the present disclosure, the upper limit or lower limit described in a certain range of values may be replaced by the value shown in the Examples.

In the present disclosure, the term "step" means not only an independent step but also a step which cannot be clearly distinguished from another step as long as the intended object of the step can be achieved.

In the present disclosure, with respect to the amount of the component contained in a composition, when a plurality of materials corresponding to the components are present in the composition, the amount of the components in the composition means the total amount of the materials present in the composition unless otherwise specified.

In the present disclosure, a combination of two or more preferred embodiments is a more preferred embodiment.

In the present disclosure, with respect to the amount of the component contained in a composition or a layer, when a plurality of materials corresponding to the components are present in the composition, the amount of the components in the composition means the total amount of the materials present in the composition unless otherwise specified.

In the present disclosure, the term "% by weight" and the term "% by mass" have the same meaning, and the term "part(s) by mass" and the term "part(s) by weight" have the same meaning.

[Aliphatic Polyester Resin]

The aliphatic polyester resin of the present disclosure will be described below in detail. In the following description, an explanation is mainly made on a polylactic acid resin which is an especially representative and preferred embodiment of the aliphatic polyester resin of the present disclosure, but we believe that the matter described in connection with the polylactic acid resin can be applied to various types of aliphatic polyester resins.

In the present disclosure, from the viewpoint of the desired mechanical physical properties, it is necessary that the polylactic acid resin have a weight average molecular weight of 500,000 or more, and the weight average molecular weight of the polylactic acid resin is preferably 550,000 or more, more preferably 600,000 or more, further preferably 650,000 or more, especially preferably 700,000 or more. With respect to the upper limit of the weight average molecular weight, there is no particular limitation, but, from the viewpoint of the productivity and handling properties, the weight average molecular weight is preferably 1,100,000 or less, more preferably 1,050,000 or less, further preferably 900,000 or less. When having a weight average molecular weight of 500,000 or more, the polylactic acid resin can be used in a formed article, such as a medical bioabsorbable screw that needs a strength. From a similar point of view, the lower limit of the number average molecular weight is preferably 200,000 or more, more preferably 240,000 or more. The upper limit of the number average molecular weight is preferably 800,000 or less, more preferably 450,000 or less. The weight average molecular weight, number average molecular weight, and the below-mentioned molecular weight distribution can be measured by a gel permeation chromatography (GPC) method.

In the present disclosure, in view of excellent mechanical physical properties, the polylactic acid resin preferably has a molecular weight distribution (which is represented by weight average molecular weight (Mw)/number average molecular weight (Mn)) of 1.0 to 4.0, and, from the viewpoint of achieving uniform physical properties of the polylactic acid resin, the molecular weight distribution is more preferably 1.5 to 3.5, further preferably 1.8 to 3.3. The molecular weight distribution of more than 4.0 means that the content of the high molecular weight component in the polylactic acid resin is large, and thus scattering is disadvantageously caused in the physical properties of the polylactic acid resin. The molecular weight distribution of less than 1.0 means that the content of the low molecular weight component in the polylactic acid resin is large, and thus the polylactic acid resin disadvantageously has such a low melt viscosity that the formability is poor.

In the present disclosure, the polylactic acid resin is a polylactic acid resin using an L-lactide or D-lactide monomer as a raw material, and the polylactic acid resin preferably has an optical purity of 95% ee or more, and, according to the desired physical properties, more preferably 97% ee or more, further preferably 98% ee or more, especially preferably 99% ee or more. The polylactic acid resin in the present disclosure has high optical purity, and therefore has improved mechanical physical properties and heat resistance, as compared to a conventional polylactic acid resin, and thus can be advantageously used in a formed article for medical use and the like. The optical purity of the polylactic acid resin can be measured from a specific rotation value obtained using a polarimeter.

The polylactic acid resin (polylactic acid resin composition) in the present disclosure preferably has a lactide content of 4,500 ppm or less. The lactide content is preferably 4,000 ppm or less, more preferably 3,000 ppm or less, further preferably 2,000 ppm or less. When having a lactide content (which is also referred to as "residual lactide content") of 4,500 ppm or less, the polylactic acid resin such as improved stress at yield point, and breaking strength has excellent mechanical physical properties, and the lactide already contained in the resin composition before melt forming is unlikely to be scattered due to sublimation or the like, and thus the polylactic acid resin composition can achieve excellent formability. With respect to the lower limit of the lactide content, there is no particular limitation, but, from the viewpoint of the productivity of the production process and the like, the lactide content is preferably 10 ppm or more, more preferably 50 ppm or more, further preferably 100 ppm or more. The lactide content can be determined by subjecting a sample dissolved in a solvent to 1H-NMR measurement and calculating an area of the obtained peak derived from lactide. Hereinafter, in the case where, like the present paragraph and the next one, it is clear that a component other than the resin, such as a lactide, is contained, the polylactic acid resin is frequently referred to as "polylactic acid resin composition", and, in the other cases, the polylactic acid resin and the polylactic acid resin composition are frequently collectively referred to as "polylactic acid resin".

Further, in the present disclosure, it is preferred that the polylactic acid resin composition obtained after subjected to heat-melting in a nitrogen atmosphere at 200° C. for 30 minutes has a lactide content of 4,000 ppm or less. The lactide content is preferably 3,500 ppm or less, more preferably 3,000 ppm or less, further preferably 2,100 ppm or less. The lactide content can be measured by substantially the same measurement method as mentioned above except that the polylactic acid resin composition is subjected the stage of heat-melting. When the polylactic acid resin composition even after subjected to heat-melting has a lactide content of 4,000 ppm or less, the amount of the lactide further formed during heat-melting is reduced, and scattering of the lactide due to sublimation is prevented, and the polylactic acid resin composition exhibits excellent formability, and a lowering of the mechanical physical properties after forming can be suppressed.

In the present disclosure, the polylactic acid resin is a polylactic acid resin which has an enthalpy of 15.0 J/g or less, as determined from peaks based on cooling crystallization made when conducting DSC measurement (differential scanning calorimeter analysis) under the following measurement conditions:

Measurement Conditions:
  that, using a differential scanning calorimeter, a sample is heated from room temperature to 200° C. at 10° C./minute, and then cooled to 20° C. at 5° C./minute or 2° C./minute.

When the polylactic acid resin in the present disclosure has an enthalpy of 15.0 J/g or less, as determined from peaks based on cooling crystallization, there can be unexpectedly obtained the polylactic acid resin which has a narrow molecular weight distribution after being heat-melted, e.g., melt-formed and then cooled and solidified, and which has an improved strength when formed into a fiber, a film, or the like, and the inventor has completed the present disclosure. Further, when the enthalpy value is 15.0 J/g or less, the cooling crystallization process is relatively slow, and therefore the polylactic acid resin can exhibit excellent formability. The enthalpy value as measured under the above-mentioned measurement conditions is preferably 12.0 J/g or less, more preferably 10.0 J/g or less, further preferably 7.0 J/g or less, especially preferably 5.0 J/g or less. Those skilled in the art have known that the lower limit of the enthalpy varies depending on the measurement conditions, but the lower limit of the enthalpy is a value of the measuring lower limit of the measuring apparatus or less, specifically, preferably 0 J/g or more, more preferably 0.05 J/g or more.

The polylactic acid resin in the present disclosure does not contain a metal component selected from the group consisting of tin, titanium, aluminum, zinc, zirconium, and antimony. Conventionally, a polylactic acid resin has generally been produced using a catalyst compound containing the above metal element. Representative examples of compounds containing the above-mentioned metal component include tin octanoate. However, in the present disclosure, it has been found that, as described later, by using a cyclic amine catalyst (cyclic amine compound) as a catalyst, a polylactic acid resin which substantially does not contain the metal component can be obtained. Further, it has been found that the obtained polylactic acid resin has characteristic features as described in the present disclosure, and the present disclosure has been completed. In the present disclosure, the polylactic acid resin which does not contain a metal component or substantially does not contain a metal component indicates that the concentration of the metal component is measured by any of quantitative analysis methods generally performed by those skilled in the art, such as an ICP emission analysis, as a method for measuring a very small amount of a metal element in a thermoplastic resin, and is the detection limit of such a method or less.

The polylactic acid resin in the present disclosure can be used in the form of a composition obtained by adding to the polylactic acid resin an additional material according to the purpose. Examples of additional materials include resins (polymers), e.g., biodegradable resins, such as polyglycolic acid, polycaprolactone, a copolymer of lactic acid and glycolic acid, a copolymer of lactic acid and caprolactone, polyhydroxybutyric acid, polyhydroxybutyrate valerate, polymalic acid, poly-α-amino acid, polyorthoester, cellulose, collagen, laminin, heparan sulfate, fibronectin, vitronectin, chondroitin sulfate, hyaluronic acid, cinnamic acid, and cinnamic acid derivatives; polyester resins, such as polyethylene terephthalate, polytrimethylene terephthalate, polybutylene terephthalate, and poly(ethylene-2,6-naphthalate); a polycarbonate resin; acrylic resins, such as polymethyl methacrylate; a polystyrene resin, a polypropylene resin, a polyarylate resin, a polyether sulfone resin, and an ABS resin, and other examples include inorganic compounds, such as metals and metal salts, other additives, such as an organic or inorganic antioxidant, flame retardant, antiseptic agent, and plasticizer, and an organic solvent.

The polylactic acid resin in the present disclosure has high molecular weight and high optical purity, and therefore can be processed into a variety of formed articles, and can be processed into an arbitrary form, such as a film form, a sheet form, a fiber form, a tape form, or a plate form. Particularly, the polylactic acid resin has excellent thermal stability, and therefore can be advantageously used in a formed article that is obtained by forming while applying heat, such as melt extrusion. Examples of specific modes of such formed articles include articles for daily use, such as nonwoven fabric, woven or knitted fabric, a film, a packing, a casing, a bottle, and materials for disposable packaging; materials for agricultural and forestry industries, such as a film for covering the ground, a bag for fertilizer, and a sustained release pesticide material; materials for fishing industry, such as a fishing net and a fishing line; articles for leisure time amusement, such as a leisure time bag and a packaging material for fishing gear; a drug delivery system material, and a medical material. Of these, the polylactic acid resin of the present disclosure does not contain a metal component, and therefore is especially suitable for a medical material. Specific examples of medical materials include implant base materials, such as a stent, a plug, a screw, and a pin; surgical sewing base materials, such as a yarn, a clip, a staple, and a surgical gauze; and a connecting material and a tissue substitution material (a bone connecting agent and a tissue regenerating material for periodontal disease operation and the like).

The method for producing an aliphatic polyester of the present disclosure (frequently referred to as "the method of the present disclosure" in the present specification) includes a method for producing an aliphatic polyester, which comprises a step of contacting a solution containing a cyclic ester with a cyclic amine catalyst and a polymerization initiator and lowering the temperature from room temperature to initiate a reaction, a step of conducting the reaction by flow-type polymerization, and a step of subjecting the product obtained in the flow-type polymerization to further reaction by postpolymerization by stirring. The former reaction is frequently referred to as "flow-type polymerization (generally referred to also as 'tube-type continuous polymerization') reaction" or "prepolymerization reaction", and the latter reaction is frequently referred to as "postpolymerization reaction".

[Initiation Step and Flow-Type Polymerization Step (Prepolymerization Reaction Step)]

The flow-type polymerization reaction in the method of the present disclosure enables polymerization at a low temperature, as compared to the temperature (about 180° C. or higher) for a conventional polymerization using a metal catalyst, such as tin octanoate, and further enables polymerization in an extremely short time, as compared to the time (about 2 to 10 hours) for a conventional polymerization using a metal catalyst, such as tin octanoate. In the reaction initiation step in the method of the present disclosure, a solution containing a cyclic ester is contacted with a cyclic amine catalyst and a polymerization initiator, and the temperature is lowered from room temperature to cause a reaction. The step in which the solution containing a cyclic ester or the cyclic amine catalyst (which may be in the form of a solution) is prepared is at room temperature, but the reaction initiation step in which the solution containing a cyclic ester and the cyclic amine catalyst are in contact is performed in such a state that the temperature is lowered from room temperature. This is because flow-type polymerization is conducted at a low temperature from the reaction initiation stage to produce an aliphatic polyester having high molecular weight and high optical purity. In the flow-type polymerization in the method of the present disclosure, from the viewpoint of satisfactorily cooling the reaction system from room temperature for suppressing a side reaction due to reaction heat, a tube having a tube diameter of about several mm is preferred. When the tube diameter can be reduced to as small a diameter as such a tube, a static mixing machine, such as a static mixer, or a dynamic stirring machine may be used. From the viewpoint of more easily reducing the tube diameter, a tube having no dynamic stirring is preferably used.

Further, the method of the present disclosure uses no metal catalyst, and hence does not need the step that has conventionally been conducted for the purpose of removing a metal catalyst from the polymer. In addition, a metal component of a polymerization catalyst, such as tin, rarely remains as an impurity in the obtained polymer, and therefore the polymer can be improved in heat resistance, weathering resistance, storage stability, or safety. Further, in the method of present disclosure, polymerization can be conducted in a solution state, and the polymerization operation properties are improved, as compared to those of conventional bulk polymerization using a metal catalyst.

<Cyclic Ester>

The cyclic ester used in the method of the present disclosure is not limited as long as it is capable of undergoing ring-opening polymerization, but examples of cyclic esters include a dimer cyclic ester of an α-hydroxycarboxylic acid, a lactone, a cyclic ether ester, and a cyclic carbonate. Examples of α-hydroxycarboxylic acids forming a dimer cyclic ester include glycolic acid, L-lactic acid, D-lactic acid, α-hydroxybutyric acid, α-hydroxyisobutyric acid, α-hydroxyvaleric acid, α-hydroxycaproic acid, α-hydroxyisocaproic acid, α-hydroxyheptanoic acid, α-hydroxyoctanoic acid, α-hydroxydecanoic acid, α-hydroxymyristic acid, α-hydroxystearic acid, and alkyl substitution products thereof. The cyclic ester may not be a dimer cyclic ester but a trimer cyclic ester or a tetramer cyclic ester when the cyclic ester is capable of being present stably as a compound and undergoing ring-opening polymerization.

Examples of lactones include β-propiolactone, β-butyrolactone, pivalolactone, γ-butyrolactone, δ-valerolactone, β-methyl-δ-valerolactone, and ε-caprolactone.

Examples of cyclic ether esters include dioxanones, such as 1,4-dioxan-2-one (p-dioxanone). Examples of cyclic carbonates include 1,3-dioxan-2-one (trimethylene carbonate).

The cyclic ester having asymmetric carbon is a cyclic ester of a D-form and/or a cyclic ester of an L-form, but, for obtaining a polymer having high optical purity, any one of a cyclic ester of a D-form and a cyclic ester of an L-form is used.

These cyclic esters can be used individually or in combination. When two or more cyclic esters are used, an arbitrary aliphatic copolyester can be obtained. The cyclic ester can be copolymerized with another copolymerizable comonomer if desired. Examples of other comonomers include cyclic monomers, such as trimethylene carbonate and 1,3-dioxolane.

In the method of the present disclosure, in view of obtaining a polylactic acid having high molecular weight and high optical purity, the cyclic ester is preferably L-lactide or D-lactide, which is a dimer cyclic ester of L-lactic acid or D-lactic acid.

The aliphatic polyester resin in the present disclosure is a polymer formed from the above-mentioned cyclic ester as a raw material monomer.

The aliphatic polyester resin in the present disclosure preferably has a weight average molecular weight (Mw) of 300,000 or more, and, according to the desired physical properties, preferably 400,000 or more, or 500,000 or more. With respect to the upper limit of the weight average molecular weight, there is no particular limitation, but, from the viewpoint of the handling properties, the weight average molecular weight is preferably 1,000,000 or less, 900,000 or less, 800,000 or less, or 700,000 or less. Further, the number average molecular weight (Mn) is preferably 200,000 or more, more preferably 240,000 or more. With respect to the upper limit of the number average molecular weight, there is no particular limitation, but, from the viewpoint of the handling properties, the number average molecular weight is preferably 800,000 or less, more preferably 450,000 or less. Further, the molecular weight distribution (Mw/Mn) is preferably 1.5 to 2.6, more preferably 1.6 to 2.5.

The polylactic acid in the present disclosure preferably has an optical purity of 95% ee or more, more preferably 97% ee or more, and, according to the desired physical properties, preferably 98% ee or more, or 99% ee or more.
<Cyclic Amine Catalyst>

The cyclic amine catalyst used in the method of the present disclosure is preferably a cyclic amine compound that is a nucleophilic compound serving as a nucleophile having basicity, and examples of cyclic amine compounds include a cyclic monoamine compound, a cyclic diamine compound (for example, a cyclic diamine compound having an amidine skeleton and the like), a cyclic triamine compound having a guanidine skeleton, a heterocyclic aromatic organic compound containing a nitrogen atom, and an N-heterocyclic carbene compound.

Examples of cyclic monoamine compounds include quinuclidine.

Examples of the cyclic diamine compounds include 1,4-diazabicyclo-[2.2.2]octane (DABCO) and 1,5-diazabicyclo [4.3.0]-5-nonene.

Examples of cyclic diamine compounds having an amidine skeleton include 1,8-diazabicyclo[5.4.0]undec-7-ene (DBU (registered trademark)) and diazabicyclononene.

Examples of cyclic triamine compounds having a guanidine skeleton include 1,5,7-triazabicyclo[4.4.0]dec-5-ene (TBD) and diphenylguanidine (DPG).

Examples of heterocyclic aromatic organic compounds containing a nitrogen N, N-dimethyl-4-atom include aminopyridine (DMAP), 4-pyrrolidinopyridine (PPY), pyrrocoline, imidazole, pyrimidine, and purine.

Examples of N-heterocyclic carbene compounds include 1,3-di-tert-butylimidazol-2-ylidene (ITBU), β-isocupreidine, and 9-azajulolidine.

Among these organic catalysts, for example, a cyclic diamine compound, such as TBD, is in the liquid state at room temperature and has a boiling point. When such an organic catalyst is selected, the organic catalyst can be substantially quantitatively removed from the obtained polymer product by treating the polymer product in a vacuum. With respect to the above-mentioned organic catalyst, one type of or two or more types of the compounds may be used in combination according to the purpose of use of the obtained aliphatic polyester resin or the like. The type of the organic catalyst or whether the removal treatment for the organic catalyst is conducted or not is determined according to the purpose of use of the product or the like.
<Polymerization Initiator>

With respect to the polymerization initiator in the method of the present disclosure, an organic or inorganic hydroxyl for initiating compound ring-opening polymerization is used. Examples of organic compounds include aliphatic primary alcohol or phenol compounds, and examples of inorganic compounds include water. From the viewpoint of the ease of the method of the present disclosure, it is preferred that the residual water in the reaction system is used, and the Examples of the present specification are conducted using the residual water in the reaction system. The amount of the hydroxyl compound added is $5 \times 10^{-4}$ to 0.01, preferably $7 \times 10^{-4}$ to 0.001, in terms of a molar ratio to the monomer. When the amount of the hydroxyl compound added is outside of the above range, it is likely that the finally obtained polymer is lowered in yield or lowered in molecular weight.
<Solvent>

It is preferred that the above-mentioned cyclic ester monomer, catalyst, and polymerization initiator are introduced into the flow-type polymerization system in the liquid state that they are dissolved in a solvent. With respect to the solvent, there is no particular limitation as long as they are dissolved in the solvent, and a solvent can be appropriately selected, and examples include polar solvents, more specifically, chlorine-substituted hydrocarbon solvents, such as dichloromethane, chloroform, and dichloroethane, ethyl acetate, tetrahydrofuran, acetonitrile, N-methylpyrrolidone, N, N-dimethylformamide, N, N-dimethylacetamide, dimethyl sulfoxide, and derivatives thereof.
<Raw Material Solution>

With respect to the concentration of the monomer in the raw material solution, there is no particular limitation, and the monomer concentration is preferably 0.01 to 3.5 M, more preferably 0.1 to 2.5 M, further preferably 0.5 to 2.0 M. When the monomer concentration is in the above range, excellent polymer productivity per unit time is maintained, and further polymerization reaction heat can be removed more effectively. The monomer concentration (M) in the method of the present disclosure means the molar number of the monomer in 1 L of the solution.

<Reaction Catalyst Solution>

With respect to the concentration of the reaction catalyst solution, there is no particular limitation, and the concentration is appropriately selected according to the above-mentioned monomer concentration, but is preferably 0.001 to 1.0 M, more preferably 0.002 to 0.75 M, further preferably 0.01 to 0.5 M, especially preferably 0.01 to 0.2 M. When the concentration of the reaction catalyst solution is in the above range, the catalyst does not suffer decomposition due to a small amount of water contained in the solvent, or the like, so that a polymerization reaction advantageously proceeds.

With respect to the equivalent ratio of the monomer and the catalyst in the reaction solution, there is no particular limitation, and the equivalent ratio can be appropriately selected according to the purpose, and the amount of the polymerization initiator relative to the monomer is preferably 1 to 1,000 equivalent, more preferably 5 to 500 equivalent, especially preferably 10 to 300 equivalent. When the equivalent ratio is in the above-mentioned especially preferred range, there is an advantage in that a polymer having a molecular weight equal to the theoretical value can be obtained.

With respect to the solvent, those which are mentioned above can be used.

<Reaction Time and Reaction Temperature>

In the method of the present disclosure, the residence time (reaction time) for the flow-type polymerization is preferably 20 to 1,800 seconds, more preferably 60 to 1,800 seconds. The residence time (reaction time) means a period of time during which a reactant is present in the polymerization reaction channel, and is represented by: residence time=$(S \times L)/V$, wherein cross-sectional area: S (m$^2$); length of the tube: L (m); and flow rate: V (m$^3$s$^{-1}$). When the residence time is in the above range, control of the polymer molecular weight is easy. Further, the reaction temperature for the flow-type polymerization is preferably 5° C. or lower, more preferably −5 to 5° C.

<Polymer Conversion after the Flow-Type Polymerization>

The polymer conversion after the flow-type polymerization (before the postpolymerization) may be generally 45 to 90%, preferably 50 to 85%, more preferably 53 to 83%. When the polymer conversion is less than 45%, it is likely that the obtained polymer has a low optical purity, and, when the polymer conversion is more than 90%, it is likely that a polymer having high molecular weight cannot be obtained.

[Postpolymerization Step]

In the method of the present disclosure, the postpolymerization step is a step in which the polymerization solution obtained in the above-mentioned flow-type polymerization is further dynamically stirred to advance polymerization, increasing the molecular weight. The postpolymerization by stirring may be, for example, polymerization conducted in a batch-wise manner using a reactor, such as a flask having a kneader or a stirrer, or polymerization conducted using a cylindrical continuous reactor having an agitating blade. The reaction temperature is preferably controlled to be 5° C. or lower, more preferably 3° C. or lower, further preferably 0° C. or lower. The reaction time in the postpolymerization step is preferably 60 seconds or more, more preferably 600 seconds or more, further preferably 90 minutes or more, especially preferably 5 hours or more.

Hereinbelow, the method of the present disclosure is described in detail with reference to the drawing.

FIG. 1 is a diagrammatic view showing a production process of an aliphatic polyester in the method of the present disclosure. The production process has two constituents, i.e., a flow-type polymerization system that is an upstream part and a postpolymerization reaction zone that is the latter part (downstream part). Hereinbelow, an explanation is made mainly on an example of the production of polylactic acid which is a preferred embodiment.

[Flow-Type Polymerization System]

The flow-type polymerization system comprises a raw material solution feed channel (1) having an inlet (1A) for introducing a raw material solution containing L-lactide which is a monomer, a catalyst solution feed channel (2) having an inlet (1B) for introducing a reaction catalyst, a joining zone (3) where the raw material solution feed channel (1) and the catalyst solution feed channel (2) join, and a polymerization reaction channel (4) connected to the downstream-side end of the joining zone, and in which a flow-type polymerization reaction is conducted. Further, the temperature of the liquid flowing through the raw material solution feed channel (1), the catalyst solution feed channel (2) and the polymerization reaction channel (4) positioned downstream of the joining zone is controlled by a thermostat (6) to be 5° C. or lower.

A feed pump, such as a syringe pump, is connected to the individual inlets, and the raw material solution and reaction catalyst are fed by the pump. In the present specification, the terms "upstream" and "downstream" are used with respect to the direction along which the liquid flows, and the side into which the liquid is introduced indicates "upstream" side, and the other side indicates "downstream" side.

<Raw Material Solution Feed Channel (1)>

The raw material solution feed channel (1) is a channel for feeding the raw material solution introduced from the inlet (1A) to the joining zone (3). The temperature of the raw material solution flowing through the raw material solution feed channel (1)) is mainly room temperature, and the joining zone and the portions around it are controlled by the above-mentioned thermostat (6) to be 5° C. or lower.

The raw material solution feed channel (1) can be composed of a tube having an equivalent diameter of about 0.1 mm to 1 cm (preferably 0.5 to 5 mm) and a length of about 10 cm to 10 m (preferably 50 cm to 5 m).

With respect to the material for the tube, there is no particular limitation, and examples of the materials include a perfluoroalkoxyalkane (PFA), Teflon (registered trademark), an aromatic polyether ketone resin, stainless steel, copper (or an alloy thereof), nickel (or an alloy thereof), titanium (or an alloy thereof), quartz glass, and soda-lime glass. From the viewpoint of the flexibility and chemical resistance, the material for the tube is preferably PFA, Teflon (registered trademark), stainless steel, a nickel alloy (Hastelloy), or titanium.

With respect to the flow rate at which the raw material solution is introduced into the raw material solution feed channel (1) through the inlet (1A), there is no particular limitation, and the flow rate can be appropriately selected according to the purpose, and is preferably 0.1 to 1,000 ml/min, more preferably 1 to 10 ml/min. When the flow rate is in the above range, quick mixing can be achieved and concern about a pressure loss is reduced.

<Catalyst Solution Feed Channel (2)>

The catalyst solution feed channel (2) is a channel for feeding the reaction catalyst solution introduced from the inlet (1B) to the joining zone (3). The temperature of the raw material solution flowing through the catalyst solution feed channel (2) is mainly room temperature, and the joining zone and the portions around it are controlled by the above-mentioned thermostat (6) to be 5° C. or lower.

The catalyst solution feed channel (2) can be composed of a tube having an equivalent diameter of about 0.1 mm to 1 cm (preferably 0.5 to 5 mm) and a length of about 10 cm to 10 m (preferably 50 cm to 5 m).

With respect to the material for the tube, there is no particular limitation, and examples of the materials include a perfluoroalkoxyalkane (PFA), Teflon (registered trademark), an aromatic polyether ketone resin, stainless steel, copper (or an alloy thereof), nickel (or an alloy thereof), titanium (or an alloy thereof), quartz glass, and soda-lime glass. From the viewpoint of the flexibility and chemical resistance, the material for the tube is preferably PFA, Teflon (registered trademark), stainless steel, a nickel alloy (Hastelloy), or titanium.

With respect to the flow rate at which the reaction catalyst is introduced into the catalyst solution feed channel (2) through the inlet (1B), there is no particular limitation, and the flow rate can be appropriately selected according to the purpose, and is preferably 0.1 to 1,000 ml/min, more preferably 0.1 to 5 ml/min. When the flow rate is in the above range, quick mixing can be achieved and concern about a pressure loss is reduced.

<Joining Zone (3)>

The raw material solution flowing through the raw material solution feed channel (1) and the reaction catalyst solution flowing through the catalyst solution feed channel (2) join in the joining zone (3). The joining zone (3) has a role of a mixer, and is not particularly limited as long as the raw material solution feed channel (1) and the catalyst solution feed channel (2) join into a single channel and the joined solution can be fed to the polymerization reaction channel (4) connected to the downstream-side end of the joining zone (3). For example, a T-shaped or Y-shaped structure or the like can be used. With respect to the material for the joining zone, there is no particular limitation, and the joining zone formed from a material, such as a perfluoroalkoxyalkane (PFA), Teflon (registered trademark), an aromatic polyether ketone resin, stainless steel, copper (or an alloy thereof), nickel (or an alloy thereof), titanium (or an alloy thereof), quartz glass, or soda-lime glass, can be used. With respect to the joining zone, a commercially available micromixer can be used. For example, there can be mentioned a microreactor having an interdigital channel structure; Single mixer and Caterpillar mixer, manufactured by Institut für Mikrotechnik Mainz (IMM); Micro glass reactor, manufactured by MicroGlass Co., Ltd.; Cytos, manufactured by CPC Systems, Inc.; YM-1, YM-2 type mixer, manufactured by Yamatake Co., Ltd.; Mixing tee and tee (T-connector), manufactured by Shimadzu GLC Ltd.; Mixing tee and tee (T-connector), manufactured by GL Sciences Inc.; Mixing tee and tee (T-connector), manufactured by Upchurch Scientific; Mixing tee and tee (T-connector), manufactured by Upchurch Scientific; Mixing tee and tee (T-connector), manufactured by Valco Instruments Co., Inc.; T-connector, manufactured by Swagelok Company; IMT chip reactor, manufactured by Institute of Microchemical Technology Co., Ltd.; and Micro Hi-Mixer, which is a product developed by Toray Engineering Co., Ltd., and any of these micromixers can be used in the method of the present disclosure.

<Polymerization Reaction Channel (4)>

The mixture solution containing the raw material solution and the reaction catalyst undergoes a reaction while flowing through the polymerization reaction channel (4), so that a polymerization reaction proceeds.

The polymerization reaction channel (4) can be composed of a tube, and, from the viewpoint of more precisely controlling the temperature of the flowing liquid, the equivalent diameter of the polymerization reaction channel (4) is preferably 1 to 50 mm, more preferably 2 to 10 mm. The length of the polymerization reaction channel (4) may be appropriately adjusted according to the equivalent diameter, flow rate, and desired molecular weight of the polymer, and is preferably 0.1 to 10 m, more preferably 1 to 5 m. Further, from the viewpoint of the pressure loss, two or more tubes having different equivalent diameters may be connected in series, and, by using a tube having a smaller equivalent diameter on the upstream side which is close to the joining zone (3) and a tube having a larger equivalent diameter on the downstream side, the pressure loss can be reduced and more excellent practical performance is achieved.

With respect to the material for the tube, there is no particular limitation, and examples of the materials include a perfluoroalkoxyalkane (PFA), Teflon (registered trademark), an aromatic polyether ketone resin, stainless steel, copper (or an alloy thereof), nickel (or an alloy thereof), titanium (or an alloy thereof), quartz glass, and soda-lime glass. From the viewpoint of the chemical resistance, thermal conductivity, and pressure resistance, the material for the tube is preferably stainless steel, a nickel alloy (Hastelloy), or titanium.

From the viewpoint of precisely controlling the optical purity, the temperature of the liquid flowing through the polymerization reaction channel (4) is preferably 10° C. or lower, more preferably 8° C. or lower, further preferably 5° C. or lower. Further, the temperature of the liquid flowing through the joining zone (3) is preferably similarly in the above-mentioned range.

The flow rate of the liquid flowing through the polymerization reaction channel (4) is preferably 1 to 100 ml/min, more preferably 2 to 50 ml/min. When the flow rate is in the above range, excellent mixing state can be maintained and further more excellent practical performance from the viewpoint of the pressure loss is advantageously obtained. The flow rate (unit: ml/min) in the polymerization reaction channel (4) is a total of the flow rate of the raw material solution feed channel (1) and the flow rate of the catalyst solution feed channel (2).

[Postpolymerization Reaction Zone (5)]

The postpolymerization reaction zone (5) is a zone which is connected to the side downstream of the polymerization reaction channel (4) through which the polymerization solution obtained in the above-mentioned flow-type polymerization flows, and in which the polymerization solution is further dynamically stirred to advance polymerization, increasing the molecular weight. The postpolymerization reaction zone (5) is not particularly limited as long as the solution can be dynamically stirred, and can be appropriately selected, and, for example, there can be mentioned a three-necked flask having a kneader or a stirrer. From the viewpoint of maintaining the optical purity, the temperature of the solution for the postpolymerization reaction is preferably controlled by a thermostat (7) to be 5° C. or lower, further preferably 0° C. or lower. The reaction time in the postpolymerization reaction zone is preferably 60 seconds or more, more preferably 600 seconds or more, especially preferably 300 minutes or more. From the viewpoint of the productivity, the reaction time is preferably 3 days or less.

With respect to the connecting part of the flow-type polymerization and the postpolymerization reaction zone, the simplest form is such that the reaction tube for the flow-type polymerization is directly introduced, but they may be connected separately using a pipe or the like. The liquid temperature in the connecting part may be a temperature equivalent to that of the polymerization reaction channel (4) or postpolymerization reaction zone (5), but it is important to remove reaction heat during the reaction in the flow-type polymerization system, and hence, even when the temperature is once increased to about room temperature in the connecting part after the reaction has proceeded, there is almost no adverse effect on the system.

[Cleaning Step]

The cleaning step is a step in which the polylactic acid resin that has been subjected to the above-mentioned post-polymerization step is cleaned with a cleaning solvent (8) charged into a cleaning apparatus (10), reducing the residual catalyst. With respect to the cleaning solvent used, there is no particular limitation as long as the polylactic acid resin is not dissolved in the solvent, and a cleaning solvent can be appropriately selected, and specific examples include alcohols, such as methyl alcohol, ethyl alcohol, and propanol, and hydrocarbon solvents, such as ethyl acetate, acetonitrile, hexane, acetone, and derivatives thereof. With respect to the temperature for cleaning, there is no particular limitation, and a temperature can be appropriately selected, but, taking the operation efficiency into consideration, the temperature for cleaning is preferably room temperature to (boiling point of the solvent −5° C.). With respect to the amount of the solvent used, there is no particular limitation, but, when the solvent is used in an amount 5 to 20 times, preferably 7 to 15 times the polylactic acid resin, in terms of a weight ratio, the polylactic acid resin can be efficiently cleaned. The polylactic acid resin and a solvent are placed in a container, such as a beaker, and stirred for one minute to one hour, and then subjected to filtration by means of a filtration apparatus (9), obtaining a polylactic acid resin having a reduced residual organic catalyst content.

EXAMPLES

Hereinbelow, the present disclosure will be described in more detail with reference to Examples and Comparative Examples, which should not be construed as limiting the scope of the present disclosure.

(a) Weight Average Molecular Weight (Mw), Number Average Molecular Weight (Mn), and Molecular Weight Distribution Values of a weight average molecular weight (Mw) and a number average molecular weight (Mn), as calculated in terms of the polystyrene resin, were measured by a gel permeation chromatography (GPC) method, and a molecular weight distribution was evaluated in terms of a value of Mw/Mn. Measurement conditions for the measuring apparatus and the like were as shown in the table below.

Apparatus: 1260 Infinity (manufactured by Agilent Technologies, Inc.)

Detector: Differential refractometer (RI (Refractive Index) detector)

Precolumn: PolyPore GUARD 7.5 mm×50 mm (manufactured by Agilent Technologies, Inc.)

Column on the sample side: Two columns of PolyPore 7.5 mm×300 mm (manufactured by Agilent Technologies, Inc.) which are connected in series Thermostat temperature: 40° C.

Mobile phase: Chloroform

Flow rate of mobile phase on the sample side: 1.0 mL/minute

Sample concentration: 2 mg/mL

Amount of sample per injection: 100 μL

Duration of data collection: 25 minutes after injection of the sample (b) Optical Purity An optical purity was determined from a ratio of the L-lactic acid and D-lactic acid constituting polylactic acid. 12 mL of chloroform was added to 120 mg of a sample, and the sample was dissolved while stirring at room temperature. The resultant solution was transferred to a cell having a cell length of 20 cm and a specific rotation was measured using a polarimeter (POLAX-2L, manufactured by Atago Co., Ltd.). From the obtained specific rotation, using −161 which is the specific rotation of polylactic acid, an optical purity was determined by making a calculation using the following formula.

$$\text{Optical purity (\% ee)} = (\text{Specific rotation of the polymerization product} \div -161) \times 100$$

(c) Metal Component Content

After completion of the polymerization reaction, 1 g of the polymer was dissolved in dichloromethane in an amount 10 times the amount of the polymer, and the resultant dichloromethane solution of the polymer was subjected to reprecipitation once in methanol in an amount 20 times the amount of the dichloromethane, obtaining a solid of polylactic acid. 0.2 g of the obtained polymer solid was dissolved in 8 ml of nitric acid and subjected to metal analysis by means of Agilent-ICP-OES-5100. The types of metals analyzed were Ag, Al, As, Ba, Ca, Cd, Co, Cr, Cu, Fe, Ga, Ge, K, Li, Mg, Mn, Mo, Na, Ni, P, Pb, Sb, Se, Si, Sn, Sr, Ti, Zn, and Zr.

(d) Polymer Conversion

A conversion from the raw material monomer to an aliphatic polyester resin after the flow-type polymerization (before the batch polymerization) was determined from $^1$H-NMR peaks using the following formula.

$$\text{Polymer conversion (\%)} = (\text{Peak area of the aliphatic polyester}) / ((\text{Peak area of the aliphatic polyester resin}) + (\text{Peak area of the raw material monomer})) \times 100$$

(e) Modulus, Elongation at Break, and Stress at Yield Point

With respect to the modulus, elongation at break, and stress at yield point, from a stress-strain curve obtained using Tensilon RTE-1210 (trade name; manufactured by A & D Company, Limited) in a general test mode, a modulus, an elongation at break, and a stress at yield point were determined. A measurement sample was prepared by dissolving a polymer in dichloromethane so that the concentration became 10 to 20% by weight. Each sample solution was cast on a horizontal plane and subjected to vacuum drying at 60° C. for 24 hours, and punched into a JIS K 6251 dumbbell-shaped specimen 8, which was used as a specimen for the measurement of a modulus, an elongation at break, and a stress at yield point. The measurement was conducted under conditions: pulling rate: 20 mm/min; and initial distance between chucks: 30 mm, and property values of a modulus, an elongation at break, and a stress at yield point were obtained. A thickness of the specimen was measured using a thickness meter when fastening the measurement specimen by chucks, and each property value was determined.

(f) Cooling Crystallization Enthalpy

A sample was heated to 200° C. which is the melting point or higher, and then a cooling crystallization enthalpy was obtained using a differential scanning calorimeter (DSC-25, manufactured by TA Instruments). Conditions for increasing and decreasing the temperature were such that the temperature was increased from room temperature to 200° C. at 10° C./min, and then cooled to 20° C. at 5° C./min or 2° C./min, and further increased to 200° C. at 10° C./min. A cooling crystallization enthalpy was calculated.

(g) Residual Lactide Content

A residual lactide content was determined from 1H-NMR peaks with respect to each sample dissolved in chloroform-d, using the following formula. Further, the 1H-NMR spectrum was used if necessary for identifying the primary structure of the obtained aliphatic polyester resin and specifying the resin formulation.

$$\text{L-lactide content (ppm) of the polylactic acid resin} = A/(A+B) \times 1{,}000{,}000$$

A: Area of the peak derived from L-lactide

B: Area of the peak derived from polylactic acid (h) Melt-Heating Evaluation 1.0 g of a polylactic acid resin sample was placed in a 50 mL eggplant-shaped flask, and an oil rotary vacuum pump was connected to the flask so that the inside of the eggplant-shaped flask was in a vacuum. The eggplant-shaped flask the inside of which is in a vacuum was immersed in an oil bath, and the sample was heated at 160° C. for 3 hours. The temperature of the oil bath was increased to 200° C. and the sample was further heated for 1.5 hours, and then the vacuum pump was removed, and the sample was heat-melted in a nitrogen atmosphere for 30 minutes. The resin obtained after melted was dissolved in dichloromethane and removed from the eggplant-shaped flask, and dichloromethane was air-dried to obtain a resin after melt-heating. The polylactic acid resin sample which has been subjected to the above operation is considered to indicate a polylactic acid resin sample which has been subjected to the heat-melting step, such as melt forming.

EXAMPLE 1

Polymerization was conducted using a reaction apparatus having the construction shown in FIG. 1. Details of the individual parts are shown below.

Raw material solution feed channel: SUS 316 tube having an outer diameter of 1/16 inch, an inner diameter of 1.0 mm, and a length of 30 cm Catalyst solution feed channel: SUS 316 tube having an outer diameter of 1/16 inch, an inner diameter of 1.0 mm, and a length of 30 cm Polymerization reaction channel: SUS 316 tube having an outer diameter of 1/8 inch, an inner diameter of 2.14 mm, and a length of 1.3 m and SUS 316 tube having an outer diameter of 1/4 inch, an inner diameter of 4.35 mm, and a length of 0.65 m Joining zone: V-Shaped micromixer (SUS 316L; channel: 1.0 mm) (Sankoh Seiki Kogyo Co., Ltd.)

Postpolymerization reaction zone: 200 mL Three-necked flask, agitating blade, agitating motor As shown in FIG. 1, all the SUS 316 tube constituting the raw material solution feed channel, the SUS 316 tube constituting the catalyst solution feed channel, and the SUS 316 tubes constituting the polymerization reaction channel were immersed in a thermostat set at 5° C. and controlled so that the liquid temperature in the channels became 5° C. The results of the preliminary study separately conducted showed that an extremely small amount of water was present in the raw material solution feed channel and the catalyst solution feed channel. The three-necked flask for the postpolymerization reaction zone was immersed in an ice bath so that the temperature was controlled to be 0° C.

Two glass vessels were prepared and, in one glass vessel, 66 g of L-lactide (L-LTD) and 180 mL of super-dehydrated dichloromethane (Wako Pure Chemical Industries, Ltd.; special grade reagent) were placed and L-lactide was dissolved, and then the resultant solution was subjected to dehydration treatment by immersing molecular sieves 3A in the solution, preparing a raw material solution (2.5 M). In another glass vessel, a dichloromethane solution of 1,5,7-triazabicyclo[4,4,0]dec-5-ene (TBD) reaction catalyst was prepared at a concentration of 4.0 mg/mL, and subjected to dehydration treatment by immersing molecular sieves 3A in the solution, preparing a reaction catalyst solution. The raw material solution was fed by a plunger pump (Model UI-22, manufactured by YMC Co., Ltd.) from the inlet to the raw material solution feed channel at 2.7 g/min. Further, the reaction catalyst solution was fed from the inlet to the catalyst solution feed channel at 0.54 g/min. The residence time (reaction time) under the above-mentioned conditions is 420 seconds in total.

Subsequently, the polymerization solution discharged from the polymerization reaction channel was introduced into the three-necked flask for the postpolymerization reaction zone. The polymerization solution was introduced into the three-necked flask for 40 minutes, and then the flask was removed from the flow-type polymerization system, and polymerization was permitted to further proceed at 300 rpm for 20 minutes.

The obtained polymerization solution was diluted with dichloromethane and ethanol was dropwise added to the solution, and the deposited white precipitate was collected by filtration. The precipitate was immersed in ethanol in the same amount, and stirred and then further collected by filtration, and the collected material was dried using a vacuum dryer, and then part of the collected material was dissolved in chloroform, and subjected to measurement of a weight average molecular weight, a number average molecular weight, molecular weight distribution, an optical purity, and a metal component concentration.

As a result, it was found that the obtained aliphatic polyester resin had an Mw of 612,000, an Mn of 318,000, an Mw/Mn of 1.9, and an optical purity of 97.7% ee. Further, the metal element concentrations measured by an ICP emission analysis were the detection limit or less.

EXAMPLE 2

Substantially the same procedure as in Example 1 was performed except that the amount of the L-lactide used was changed to 53 g (2.0 M). As a result of the analyses, it was found that the obtained aliphatic polyester resin had an Mw of 585,000, an Mn of 342,000, an Mw/Mn of 1.7, and an optical purity of 98.2% ee. Further, the metal element concentrations measured by an ICP emission analysis were the detection limit or less.

EXAMPLE 3

Substantially the same procedure as in Example 2 was performed except that the temperature of the postpolymerization reaction zone was changed to −8° C. As a result of the analyses, it was found that the obtained aliphatic polyester resin had an Mw of 508,000, an Mn of 264,000, an Mw/Mn of 1.9, and an optical purity of 99.5% ee. Further, the metal element concentrations measured by an ICP emission analysis were the detection limit or less.

EXAMPLE 4

Substantially the same procedure as in Example 2 was performed except that the reaction time for the postpolymerization reaction zone was changed to 90 minutes. As a result of the analyses, it was found that the obtained aliphatic polyester resin had an Mw of 573,000, an Mn of 243,000, an Mw/Mn of 2.4, and an optical purity of 99.4% ee. Further, the metal element concentrations measured by an ICP emission analysis were the detection limit or less.

EXAMPLE 5

Substantially the same procedure as in Example 2 was performed except that the reaction time for the postpolymerization reaction zone was changed to 300 minutes. As a result of the analyses, it was found that the obtained aliphatic polyester resin had an Mw of 720,000, an Mn of 342,000, an

COMPARATIVE EXAMPLE 3

The flow-type polymerization system was not used, and 10 g of L-lactide and 44 mL of super-dehydrated dichloromethane were placed in the three-necked flask and L-lactide was dissolved, and then the flask was immersed in an ice bath to cool the resultant solution to −5° C. 36 mg of TBD was added to the solution and the resultant mixture was stirred for 5 minutes to perform a polymerization reaction. As a result of the analyses, it was found that the obtained aliphatic polyester resin had an Mw of 526,000, an Mn of 280,000, an Mw/Mn of 1.9, and an optical purity of 96.3% ee. Further, the metal element concentrations measured by an ICP emission analysis were the detection limit or less.

The main polymerization conditions for the flow-type polymerization and batch polymerization in Examples 1 to 5 and Comparative Examples 1 to 3 are shown in Table 1, and the weight average molecular weight (Mw), number average molecular weight (Mn), molecular weight distribution (Mw/Mn), and optical purity of the obtained aliphatic polyester resins are shown in Table 2.

TABLE 1

| | Raw material solution concentration | | Temperature (Prepolymerization step) | Conversion before post-polymerization | Temperature (Post-polymerization step) | Batch polymerization time (min) |
|---|---|---|---|---|---|---|
| Example 1 | 18% | 2.5M | 5° C. | 82% | 0° C. | 20 |
| Example 2 | 15% | 2.0M | 5° C. | 79% | 0° C. | 20 |
| Example 3 | 15% | 2.0M | 5° C. | 55% | −8° C. | 20 |
| Example 4 | 15% | 2.0M | 5° C. | 59% | 0° C. | 90 |
| Example 5 | 15% | 2.0M | 5° C. | 71% | 0° C. | 300 |
| Comparative Example 1 | 18% | 2.5M | 5° C. | 72% | — | — |
| Comparative Example 2 | 23% | 3.5M | Room temperature | 66% | 0° C. | 20 |
| Comparative Example 3 | 15% | 2.0M | — | — | −5° C. | 5 |

Mw/Mn of 2.1, and an optical purity of 99.4% ee. Further, the metal element concentrations measured by an ICP emission analysis were the detection limit or less.

COMPARATIVE EXAMPLE 1

Substantially the same procedure as in Example 1 was performed except that the polymerization reaction in the postpolymerization reaction zone was not conducted. As a result of the analyses, it was found that the obtained aliphatic polyester resin had an Mw of 431,000, an Mn of 234,000, an Mw/Mn of 1.8, and an optical purity of 98.4% ee. Further, the metal element concentrations measured by an ICP emission analysis were the detection limit or less.

COMPARATIVE EXAMPLE 2

Substantially the same procedure as in Example 1 was performed except that the amount of the L-lactide used was changed to 92 g (3.5 M), and that the reaction temperature of the flow-type polymerization system was changed to room temperature (20° C.). As a result of the analyses, it was found that the obtained aliphatic polyester resin had an Mw of 511,000, an Mn of 276,000, an Mw/Mn of 1.9, and an optical purity of 94.7% ee. Further, the metal element concentrations measured by an ICP emission analysis were the detection limit or less.

TABLE 2

| | Mw (×10⁴) | Mn (×10⁴) | Mw/Mn | Optical purity |
|---|---|---|---|---|
| Example 1 | 61.2 | 31.8 | 1.9 | 97.7% |
| Example 2 | 58.5 | 34.2 | 1.7 | 98.2% |
| Example 3 | 50.8 | 26.4 | 1.9 | 99.5% |
| Example 4 | 57.3 | 24.3 | 2.4 | 99.4% |
| Example 5 | 72.0 | 34.2 | 2.1 | 97.4% |
| Comparative Example 1 | 43.1 | 23.4 | 1.8 | 98.4% |
| Comparative Example 2 | 51.1 | 27.6 | 1.9 | 94.7% |
| Comparative Example 3 | 52.6 | 28.0 | 1.9 | 96.3% |

EXAMPLE 6

All the raw material solution feed channel, catalyst solution feed channel, and polymerization reaction channel shown in FIG. 1 were immersed in a thermostat set at 5° C. and controlled so that the liquid temperature in the channels became 5° C. The three-necked flask for the postpolymerization reaction zone was immersed in an ice bath so that the temperature was controlled to be 0° C.

Two glass vessels were prepared, and, in one glass vessel, 66 g of L-lactide and 180 mL of super-dehydrated dichloromethane were placed and L-lactide was dissolved, and then the resultant solution was subjected to dehydration treatment by immersing molecular sieves 3A in the solution, preparing a raw material solution. In another glass vessel, a dichloromethane solution of 1,5,7-triazabicyclo[4,4,0]dec-5-ene as a reaction catalyst was prepared at a concentration of 4.0 mg/mL, and subjected to dehydration treatment by immersing molecular sieves 3A in the solution, preparing a reaction catalyst solution. The raw material solution was fed by a plunger pump from the inlet to the raw material solution feed channel at 2.7 g/min. Further, the reaction catalyst solution was fed from the inlet to the catalyst solution feed channel at 0.54 g/min to perform the flow-type polymerization step. The residence time (reaction time) under the above-mentioned conditions is 420 seconds in total.

Subsequently, the polymerization solution discharged from the polymerization reaction channel was introduced into the three-necked flask for the postpolymerization reaction zone. The polymerization solution was introduced into the three-necked flask for 40 minutes, and then the flask was removed from the flow-type polymerization system, and polymerization was permitted to further proceed at 300 rpm for 20 minutes.

The obtained polymerization solution was diluted with dichloromethane and ethanol was dropwise added to the solution, and the deposited white precipitate was collected by filtration. Subsequently, 10 g of the obtained white precipitate and ethanol in an amount 10 times the amount of the precipitate were placed in a beaker, and stirred for 20 minutes and subjected to filtration to perform the above-mentioned cleaning step, obtaining a polylactic acid resin having removed the organic catalyst. This operation was repeated three times, and the obtained polylactic acid resin was dried using a vacuum dryer set at 120° C. for 4 hours.

With respect to the obtained polylactic acid resin, a molecular weight, molecular weight distribution, an optical purity, and metal component concentrations were measured. As a result, it was found that the polylactic acid resin had a weight average molecular weight of 792,000, a number average molecular weight of 331,000, an Mw/Mn of 2.39, and an optical purity of 98% ee, and the metal element concentrations measured by an ICP emission analysis were the detection limit or less. Using this sample, a cooling crystallization enthalpy was measured by the above-mentioned measurement method at a temperature decrease rate of 5° C./min for the differential scanning calorimeter, and, as a result, it was found to be the measuring lower limit or less (<0.1 J/g).

EXAMPLE 7

Substantially the same procedure as in Example 6 was performed except that the conditions for the flow-type polymerization step and the postpolymerization step were changed, and that the polylactic acid resin was changed to a polylactic acid resin having a weight average molecular weight of 1,033,000, a number average molecular weight of 421,000, an Mw/Mn of 2.45, and an optical purity of 99% ee. A cooling crystallization enthalpy was measured, and, as a result, it was found to be the measuring lower limit or less (<0.1 J/g). Further, the metal element concentrations measured by an ICP emission analysis were the detection limit or less.

EXAMPLE 8

Substantially the same procedure as in Example 6 was performed except that the temperature decrease rate of the differential scanning calorimeter was changed to 2° C./min. A cooling crystallization enthalpy was measured, and, as a result, it was found to be 1.4 J/g. Further, the metal element concentrations measured by an ICP emission analysis were the detection limit or less.

EXAMPLE 9

The polylactic acid resin used in Example 6 was subjected to the above-mentioned melt-heating evaluation, obtaining a polylactic acid resin after melt-heating. As a result of the analyses, it was found that the obtained polylactic acid resin had a weight average molecular weight of 653,000, a number average molecular weight of 203,000, an Mw/Mn of 3.22, and an optical purity of 95% ee. With respect to the obtained polylactic acid resin, a cooling crystallization enthalpy was measured by the same method as in Example 1, and, as a result, it was found to be 1.1 J/g. Further, the metal element concentrations measured by an ICP emission analysis were the detection limit or less. Using this polylactic acid resin sample, a modulus, an elongation at break, and a stress at yield point were measured.

COMPARATIVE EXAMPLE 4

With respect to the polylactic acid resin (weight average molecular weight: 1,464,000; number average molecular weight: 694,000; Mw/Mn: 2.11; optical purity: 98% ee) synthesized by melt polymerization using a tin compound as a catalyst, a cooling crystallization enthalpy was measured by the same method as in Example 1, and, as a result, it was found to be 39.3 J/g. The metal element concentrations measured by an ICP emission analysis were 17 ppm for Ca, 10 ppm for K, 4 ppm for Na, and 2.7 ppm for Sn, and the other metal element concentrations were the detection limit or less.

COMPARATIVE EXAMPLE 5

Substantially the same procedure as in Comparative Example 4 was performed except that the temperature decrease rate of the differential scanning calorimeter was changed to 2° C./min. A cooling crystallization enthalpy was measured, and, as a result, it was found to be 42.0 J/g. The metal element concentrations measured by an ICP emission analysis were 14 ppm for Ca, 10 ppm for K, 5 ppm for Na, and 3.2 ppm for Sn, and the other metal element concentrations were the detection limit or less.

COMPARATIVE EXAMPLE 6

The polylactic acid resin used in Comparative Example 4 was subjected to the above-mentioned melt-heating evaluation, obtaining a polylactic acid resin after melt-heating. As a result of the analyses, it was found that the obtained polylactic acid resin had a weight average molecular weight of 634,000, a number average molecular weight of 137,000, an Mw/Mn of 4.63, and an optical purity of 95% ee. With respect to the obtained polylactic acid resin, a cooling crystallization enthalpy was measured by the same method as in Example 1 and, as a result, it was found to be 18.1 J/g. The metal element concentrations measured by an ICP emission analysis were 17 ppm for Ca, 13 ppm for K, 7 ppm for Na, and 2.8 ppm for Sn, and the other metal element concentrations were the detection limit or less. Using this polylactic acid resin sample, a modulus, an elongation at break, and a stress at yield point were measured.

The results of Examples 6 to 9 and Comparative Examples 4 to 6 are shown in Tables 3 and 4 below.

TABLE 3

| | Melt-heating | Cooling rate (° C./min) | Mw (×10⁴) | Mn (×10⁴) | Mw/Mn | Residual lactide content (ppm) | Optical purity (% ee) | Cooling crystallization enthalpy (J/g) |
|---|---|---|---|---|---|---|---|---|
| Example 6 | No | 5 | 79.2 | 33.1 | 2.39 | 1,893 | 98% | <0.1 |
| Example 7 | No | 5 | 103.3 | 42.1 | 2.45 | 1,893 | 99% | <0.1 |
| Example 8 | No | 2 | 79.2 | 33.1 | 2.39 | 1,893 | 98% | 1.4 |
| Example 9 | Done | 5 | 65.3 | 20.3 | 3.22 | 2,094 | 95% | 1.1 |
| Comparative Example 4 | No | 5 | 146.4 | 69.4 | 2.11 | 27,747 | 98% | 39.3 |
| Comparative Example 5 | No | 2 | 146.4 | 69.4 | 2.11 | 27,747 | 98% | 42.0 |
| Comparative Example 6 | Done | 5 | 63.4 | 13.7 | 4.63 | 4,698 | 95% | 18.1 |

TABLE 4

| | Modulus (GPa) | Elongation at break (%) | Stress at yield point (MPa) | Thickness (μm) |
|---|---|---|---|---|
| Example 9 | 1.63 | 55.4 | 49.9 | 43 |
| Comparative Example 6 | 1.54 | 64.4 | 42.4 | 43 |

As can be seen from Table 4, the polylactic acid resin disclosed in Example 9 had high modulus, high stress at yield point, and small elongation at break, and thus had excellent mechanical physical properties, as compared to Comparative Example 6.

REFERENCE SIGNS LIST

1A: Inlet (Raw material solution)
1B: Inlet (Reaction catalyst solution)
1: Raw material solution feed channel
2: Catalyst solution feed channel
3: Joining zone
4: Polymerization reaction channel
5: Postpolymerization reaction zone
6, 7: Thermostat

8: Cleaning solvent
9: Filtration apparatus
10: Cleaning apparatus

The invention claimed is:

1. A method for producing an aliphatic polyester, comprising a step of contacting a solution containing a cyclic ester with a cyclic amine catalyst and a polymerization initiator and lowering the temperature from room temperature to initiate a reaction, a step of conducting the reaction by flow-type polymerization, and a step of subjecting the product obtained in the flow-type polymerization to further reaction by postpolymerization by stirring, wherein the product obtained in the flow-type polymerization has a polymer conversion of 45 to 90%.

2. The method according to claim 1, wherein the reaction temperature for the flow-type polymerization is 5° C. or lower, and the reaction temperature for the postpolymerization is 5° C. or lower.

3. The method according to claim 1, wherein the postpolymerization by stirring is batch polymerization.

4. The method according to claim 1, wherein the cyclic ester is L-lactide or D-lactide.

5. The method according to claim 2, wherein the postpolymerization by stirring is batch polymerization.

* * * * *